(12) United States Patent
Hoshino et al.

(10) Patent No.: US 11,345,072 B2
(45) Date of Patent: May 31, 2022

(54) BLOW MOLDING DEVICE

(71) Applicant: YOSHINO KOGYOSHO CO., LTD., Tokyo (JP)

(72) Inventors: Hideaki Hoshino, Tokyo (JP); Mitsuru Shiokawa, Tokyo (JP); Yuichi Okuyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 17/295,977

(22) PCT Filed: Oct. 21, 2019

(86) PCT No.: PCT/JP2019/041392
§ 371 (c)(1),
(2) Date: May 21, 2021

(87) PCT Pub. No.: WO2020/110516
PCT Pub. Date: Jun. 4, 2020

(65) Prior Publication Data
US 2021/0394421 A1 Dec. 23, 2021

(30) Foreign Application Priority Data

Nov. 27, 2018 (JP) .............................. JP2018-221595
Sep. 24, 2019 (JP) .............................. JP2019-173505

(51) Int. Cl.
*B29C 49/46* (2006.01)
*B29C 49/58* (2006.01)
*B29C 49/12* (2006.01)

(52) U.S. Cl.
CPC .............. *B29C 49/12* (2013.01); *B29C 49/46* (2013.01); *B29C 49/58* (2013.01); *B29C 2049/4664* (2013.01); *B29C 2049/5803* (2013.01)

(58) Field of Classification Search
CPC . B29C 49/46; B29C 49/58; B29C 2049/4664; B29C 2049/5803
See application file for complete search history.

(56) References Cited

U.S. PATENT DOCUMENTS

| 11,077,601 B2 * | 8/2021 | Okuyama ............... B29C 49/06 |
| 2002/0053760 A1 | 5/2002 | Boyd et al. |

(Continued)

FOREIGN PATENT DOCUMENTS

| JP | 2013-208834 A | 10/2013 |
| JP | 2016-168800 A | 9/2016 |

(Continued)

OTHER PUBLICATIONS

Jan. 21, 2020 International Search Report issued in International Patent Application No. PCT/JP2019/041392.

*Primary Examiner* — Robert B Davis
(74) *Attorney, Agent, or Firm* — Oliff PLC

(57) ABSTRACT

A blow molding device includes a nozzle, a pressurized fluid supply source, a seal body, and a rod. The seal body includes a tubular wall. A communication depression extending from a lower end of the tubular wall to a communication port open on an outer circumferential surface of the tubular wall is provided in an inner circumferential surface of the seal body. A communication path is provided in the nozzle. The blow molding device further includes a fluid suction source configured to suck an incompressible fluid from the communication depression through the communication path and the communication port, and/or a pressurized gas supply source configured to supply a pressurized gas that blows off the incompressible fluid from the communication depression through the communication path and the communication port.

6 Claims, 6 Drawing Sheets

(56) References Cited

U.S. PATENT DOCUMENTS

| | | |
|---|---|---|
| 2006/0107835 A1 | 5/2006 | Heilmann et al. |
| 2018/0043606 A1* | 2/2018 | Morikami ............... B29C 49/58 |
| 2020/0171733 A1* | 6/2020 | Shiokawa ............... B29C 49/12 |
| 2020/0353666 A1* | 11/2020 | Shiokawa ............... B29C 49/46 |

FOREIGN PATENT DOCUMENTS

| | | |
|---|---|---|
| JP | 2018-183973 A | 11/2018 |
| WO | WO-2020241063 A1 * | 12/2020 |
| WO | WO-2021039108 A1 * | 3/2021 |
| WO | WO-2021084834 A1 * | 5/2021 |

* cited by examiner

BLOW MOLDING DEVICE

TECHNICAL FIELD

The present disclosure relates to a blow molding device.

BACKGROUND

Resin-made containers such as bottles made of polypropylene (PP) and bottles (PET bottles) made of polyethylene terephthalate (PET) are used to contain various contents including beverages, cosmetics, medicines, detergents, and toiletries such as shampoos. Such a container is typically obtained as follows: A resin-made preform formed in a bottomed tubular shape by injection molding or the like is heated to a temperature at which stretching effect can be exhibited, and, in this state, subjected to biaxial stretching blow molding using a blow molding device to be formed in a predetermined shape.

A known blow molding device uses an incompressible fluid such as a pressurized liquid instead of pressurized air, as a pressurized fluid supplied into a preform. In this case, the contents to be contained in the container as a product are used as the fluid for pressurization, so that a step of filling the container with the contents can be omitted and the production process and the structure of the blow molding device can be simplified.

For example, JP 2013-208834 A (PTL 1) describes a blow molding device that includes: a mold in which a preform can be placed; a nozzle engageable with a mouth portion of the preform; a pressurized fluid supply source capable of supplying a pressurized liquid to the nozzle; and a stretching rod movable in a vertical direction, and, while stretching the preform in a longitudinal direction (axial direction) by the stretching rod, supplies the pressurized liquid into the preform and stretches the preform in a transverse direction (radial direction) to mold the preform into a container of a shape along the cavity of the mold.

CITATION LIST

Patent Literature

PTL 1: JP 2013-208834 A

SUMMARY

Technical Problem

With the conventional blow molding device described in PTL 1, when the nozzle is raised to separate from the mouth portion of the container after the blow molding, the liquid (incompressible fluid) adhering to the surface of the nozzle or the surface of the stretching rod may drip down. Particularly in the case where the incompressible fluid for blow molding is a liquid with relatively high viscosity such as a shampoo or a liquid detergent, the time for the liquid to drip down from the nozzle or the like after the blow molding is long, and also the liquid keeps dripping for a while in a drizzling manner. Hence, the liquid tends to drip onto the molded container or the mold from which the container has been removed, and adhere to the container or the mold.

It could therefore be helpful to provide a blow molding device that can, when a nozzle is separated from a mouth portion of a molded container after blow molding, prevent an incompressible fluid from dripping from the nozzle and thus prevent the fluid from adhering to the molded container or the mold.

Solution to Problem

A blow molding device according to the present disclosure comprises: a tubular nozzle; a pressurized fluid supply source configured to supply a pressurized incompressible fluid to the nozzle; a tubular seal body configured to move in a vertical direction between a closed position in which the nozzle is closed and an open position in which the nozzle is open; and a rod having an outer circumferential surface that faces an inner circumferential surface of the seal body, and configured to move in the vertical direction, wherein the seal body includes a tubular wall having an outer circumferential surface that faces the nozzle when the seal body is in the closed position, a concave communication depression extending from a lower end of the tubular wall to a communication port open on the outer circumferential surface of the tubular wall is provided in the inner circumferential surface of the seal body, a communication path that communicates with the communication port when the seal body is in the closed position is provided in the nozzle, and the blow molding device further comprises at least one of: a fluid suction source configured to suck the incompressible fluid from the communication depression through the communication path and the communication port; and a pressurized gas supply source configured to supply a pressurized gas that blows off the incompressible fluid from the communication depression through the communication path and the communication port.

Preferably, in the blow molding device according to the present disclosure, the communication depression is composed of a plurality of vertical grooves arranged at regular intervals in a circumferential direction of the tubular wall and each extending in the vertical direction, and an inner circumferential surface of the tubular wall located between the plurality of vertical grooves comes into contact with the outer circumferential surface of the rod.

Preferably, in the blow molding device according to the present disclosure, a concave outer communication depression extending from the lower end of the tubular wall to the communication port is provided in an outer circumferential surface of the seal body.

Preferably, in the blow molding device according to the present disclosure, the outer communication depression is composed of a plurality of outer vertical grooves arranged at regular intervals in a circumferential direction of the tubular wall and each extending in the vertical direction.

Advantageous Effect

It is thus possible to provide a blow molding device that can, when a nozzle is separated from a mouth portion of a molded container after blow molding, prevent an incompressible fluid from dripping from the nozzle and thus prevent the fluid from adhering to the molded container or the mold.

DETAILED DESCRIPTION

More detailed description will be given below with reference to the drawings.

Herein, the term "vertical direction" denotes an up-down direction. In one of the disclosed embodiments described below, a nozzle 7, a seal body 11, and a rod 16 have a common central axis O in the vertical direction. In this embodiment, the term "longitudinal section" denotes a section by a plane including the central axis O, and the term "cross section" denotes a section by a plane perpendicular to the central axis O. The radial direction with respect to the central axis O is also simply referred to as "radial direction", the circumferential direction with respect to the central axis O is also simply referred to as "circumferential direction", and the axial direction of the central axis O is also simply referred to as "axial direction".

Figure 1:
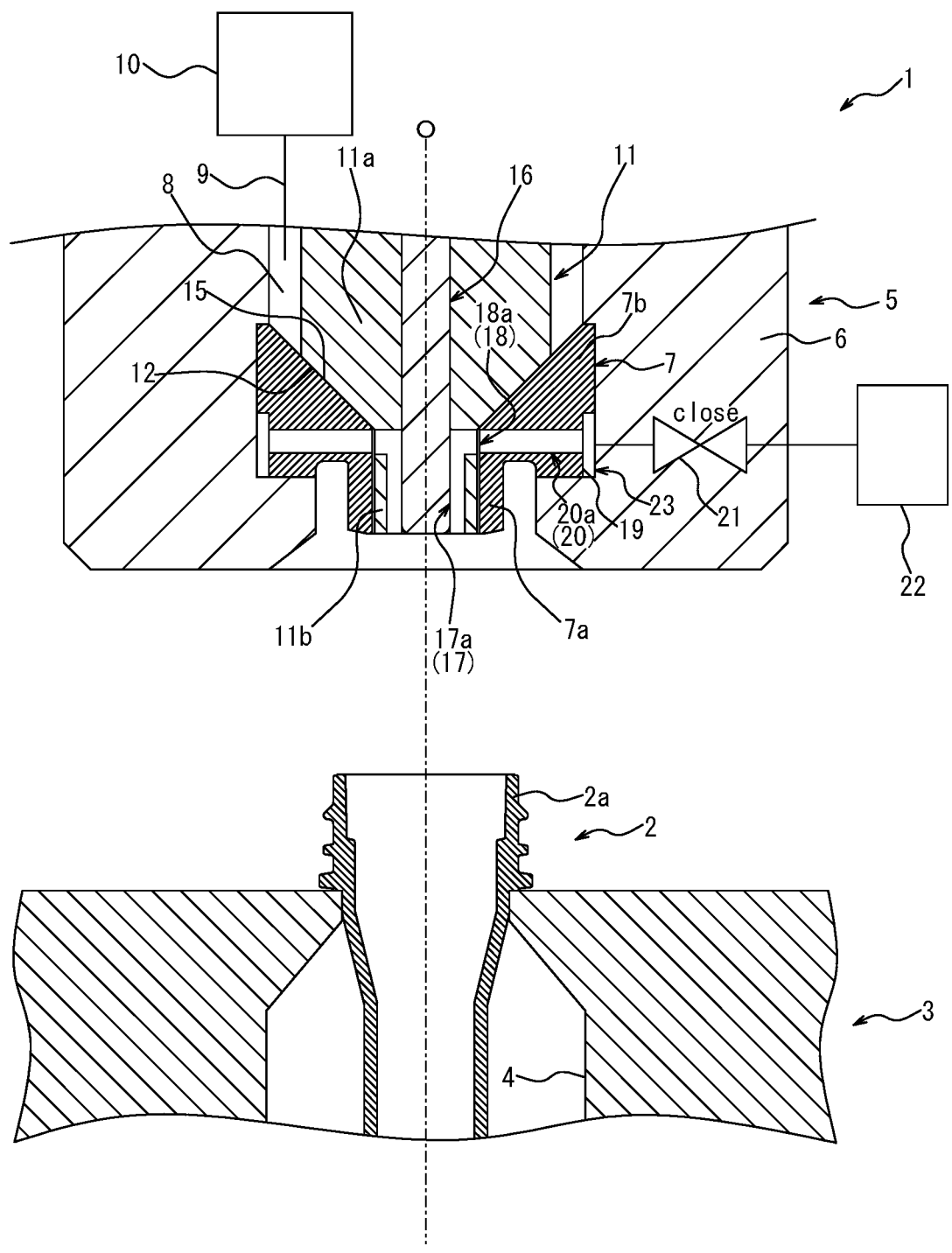
FIG. 1 is a longitudinal sectional view illustrating a blow molding device according to one of the disclosed embodiments in a standby state.
Figure 3:
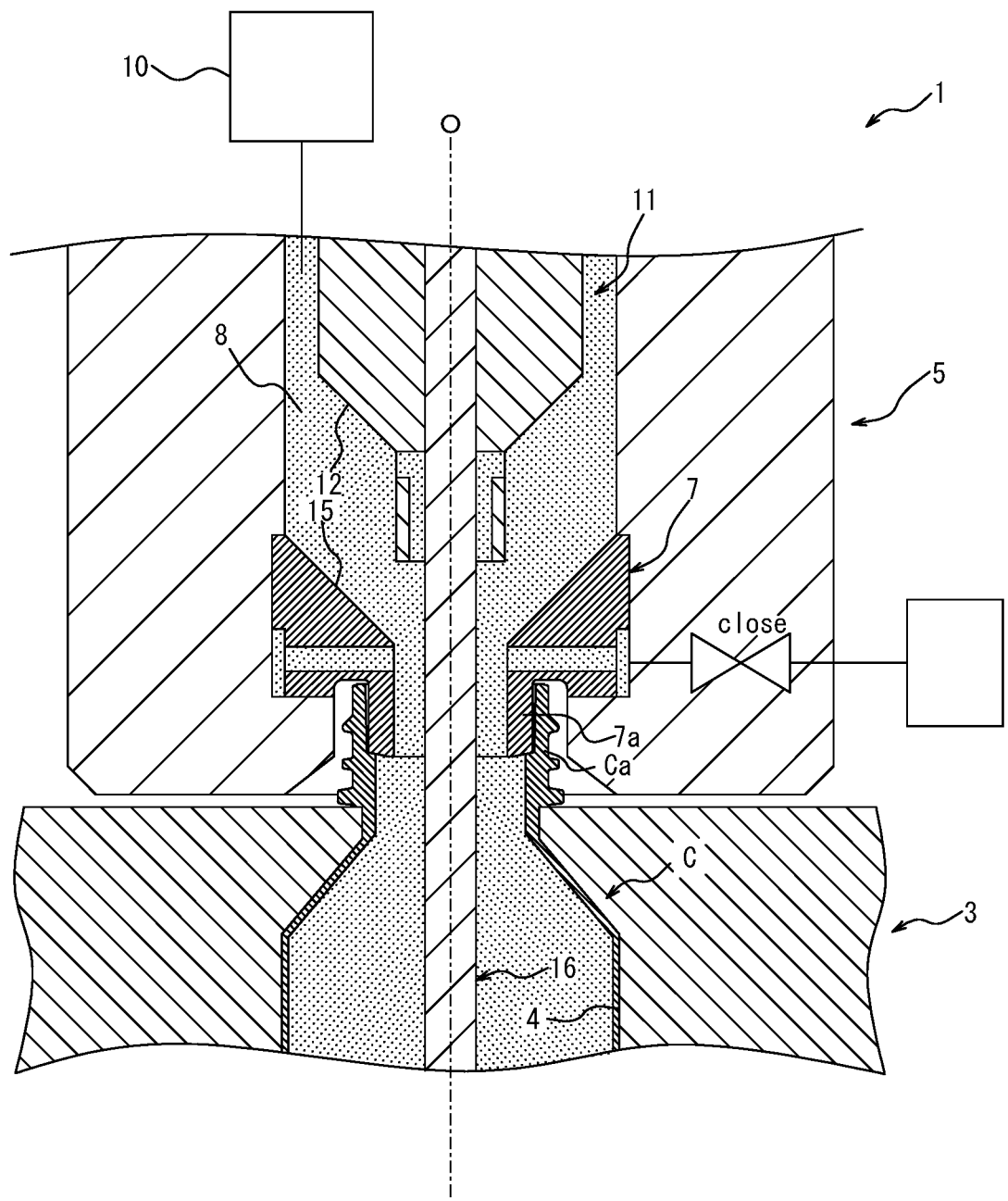
FIG. 3 is a longitudinal sectional view illustrating the blow molding device illustrated in FIG. 1 in a blow molding state.

As illustrated in FIG. 1, a blow molding device 1 according to one of the disclosed embodiments is a device that blow molds a bottomed tubular preform 2 having a mouth portion 2a into a container C (see FIG. 3). The blow molding device 1 includes a mold 3 in which the preform 2 can be placed. The mold 3 has a bottle-shaped cavity 4 (only partially illustrated in the drawing) that is open on the upper surface of the mold 3. The preform 2 is placed in the mold 3 in a standing position with the mouth portion 2a being on the upper side. When the preform 2 is placed in the mold 3, the mouth portion 2a projects upward from the cavity 4. The mold 3 is openable right and left, and the molded container C can be taken out of the mold 3 by opening the mold 3, although not illustrated in detail.

The preform 2 can be obtained, for example, by forming a thermoplastic resin material that develops stretchability as a result of heating, such as polypropylene (PP), polyethylene terephthalate (PET), or polyethylene (PE), in a bottomed tubular shape by injection molding, compression molding, extrusion molding, or the like.

A nozzle unit 5 is provided above the mold 3 so as to be movable in the vertical direction relative to the mold 3. The nozzle unit 5 includes a main block 6. The main block 6 is a combination of a plurality of members, although its detailed description and illustration are omitted.

The nozzle unit 5 includes a tubular nozzle 7 that can engage with the mouth portion 2a of the preform 2. The nozzle 7 has a nozzle tip 7a formed in a cylindrical shape whose outer diameter is smaller than the inner diameter of the mouth portion 2a of the preform 2 so that the lower end surface of the nozzle tip 7a will abut a step portion formed on the inner surface of the mouth portion 2a of the preform 2. The outer diameter of the nozzle tip 7a may be equal to the inner diameter of the mouth portion 2a of the preform 2 so that the outer circumferential surface of the nozzle tip 7a will abut the inner circumferential surface of the mouth portion 2a. As a result of the nozzle tip 7a being inserted into the mouth portion 2a of the preform 2, the nozzle 7 can engage with the mouth portion 2a. The nozzle 7 also has a sandwiched portion 7b integrally provided above the nozzle tip 7a, and is sandwiched and fixed by the inner surface of the main block 6 at the sandwiched portion 7b. For example, the nozzle 7 may be made of a steel material, a resin material, or the like.

The nozzle 7 is located coaxially with the cavity 4 of the mold 3. Hence, as a result of the nozzle unit 5 being lowered to a predetermined position, the nozzle tip 7a can be inserted into the mouth portion 2a of the preform 2 placed in the mold 3.

A supply path 8 extending in the vertical direction is formed inside the main block 6. The supply path 8 is connected to the nozzle 7 from above. The supply path 8 is also connected to a pressurized fluid supply source 10 through a piping 9. The pressurized fluid supply source 10 can supply an incompressible fluid pressurized to a predetermined pressure to the nozzle 7 through the piping 9 and the supply path 8. That is, the pressurized fluid supply source 10 can supply the pressurized incompressible fluid to the preform 2 through the piping 9, the supply path 8, and the nozzle 7 during blow molding.

As the pressurized fluid supply source 10, for example, a plunger pump is preferably used as a pressurization source. However, the pressurized fluid supply source 10 may have any other structure as long as it can supply the incompressible fluid pressurized to the predetermined pressure to the supply path 8.

As the incompressible fluid supplied from the pressurized fluid supply source 10 to the nozzle 7, i.e. the preform 2, for example, a liquid with relatively high viscosity, such as a shampoo or a liquid detergent, may be used. In this case, the viscosity of the incompressible fluid when supplied to the preform 2 is preferably 10000 mPa·s or less.

A tubular seal body 11 for opening and closing the nozzle 7 is placed in the supply path 8. The seal body 11 is movable in the vertical direction between a closed position in which the seal body 11 abuts the nozzle 7 from above and closes the nozzle 7 and an open position in which the seal body 11 separates from the nozzle 7 and opens the nozzle 7. The seal body 11 includes a cylindrical shaft body (not illustrated), a cylindrical large-diameter portion 11a integrally connected to the lower end of the shaft body and having an outer diameter larger than the shaft body, and a cylindrical tubular wall 11b integrally connected to the lower end of the large-diameter portion 11a and having an outer diameter smaller than the large-diameter portion 11a. A downward-pointing conical inclined surface 12 is provided at the lower end of the large-diameter portion 11a.

The seal body 11 is a single member made of a steel material, a resin material, or the like. Alternatively, the seal body 11 may be composed of a plurality of members.

A downward-pointing conical closed surface 15 is provided at the upper surface of the nozzle 7, i.e. the upper surface of the sandwiched portion 7b of the nozzle 7. As a result of the seal body 11 moving to the closed position that is the lower stroke end and the inclined surface 12 provided at the lower end of the large-diameter portion 11a abutting the closed surface 15 from above, the communication between the supply path 8 and the nozzle tip 7a can be blocked by the seal body 11 to close the nozzle 7. As a result of the seal body 11 moving upward from the closed position to the open position and the inclined surface 12 separating upward from the closed surface 15 of the nozzle 7, the supply path 8 and the nozzle tip 7a can communicate with each other to open the nozzle 7. The shape of each of the inclined surface 12 and the closed surface 15 may be changed as appropriate. The nozzle 7 may be closed and opened by the outer circumferential surface of the tubular wall 11b and the inner circumferential surface of the nozzle 7 abutting and separating from each other.

As a result of the nozzle tip 7a being inserted into the mouth portion 2a of the preform 2 placed in the mold 3 and the nozzle 7 being opened by the seal body 11 in a state in which the pressurized fluid supply source 10 is in operation, the pressurized incompressible fluid can be supplied from the pressurized fluid supply source 10 into the preform 2 through the nozzle 7 to blow mold the preform 2. As a result of the nozzle 7 being closed by the seal body 11 after the blow molding, the supply of the incompressible fluid into the molded container C can be stopped.

The blow molding device 1 includes a rod 16 surrounded by the seal body 11 and movable in the vertical direction. In this embodiment, the rod 16 is used as a rod for biaxial stretching. Accordingly, the rod 16 is hereafter also referred to as "stretching rod 16". The stretching rod 16 is slidably installed in a hole formed at the axial center of the seal body 11, and is movable in the axial direction, i.e. the vertical direction, relative to the seal body 11. In blow molding, by moving the stretching rod 16 downward relative to the seal body 11, the preform 2 placed in the mold 3 can be stretched inside the cavity 4 in the axial direction (longitudinal direction) by the stretching rod 16. Thus, the blow molding device 1 can perform biaxial stretching blow molding on the preform 2. The stretching rod 16 has a solid columnar shape.

The inner circumferential surface of the nozzle 7 (the nozzle tip 7a and the sandwiched portion 7b) is a cylindrical inner circumferential surface. The tubular wall 11b of the seal body 11 has an outer circumferential surface that faces the inner circumferential surface of the nozzle 7 when the seal body 11 is in the closed position. A slight gap is provided between the outer circumferential surface of the tubular wall 11b and the inner circumferential surface of the nozzle 7 to reduce the sliding resistance therebetween. The outer circumferential surface of the tubular wall 11b may be configured to be in sliding contact with the inner circumferential surface of the nozzle 7. The tubular wall 11b has its lower end flush with the lower end of the nozzle tip 7a when the seal body 11 is in the closed position.

The blow molding device 1 includes a suction mechanism to prevent the incompressible fluid from dripping from the stretching rod 16, the seal body 11, and the nozzle 7 after blow molding. The suction mechanism includes: a communication depression 17 provided in the inner circumferential surface of the seal body 11; a communication port 18 open on the outer circumferential surface of the tubular wall 11b; a communication path 20 provided in the nozzle 7; and a fluid suction source 22 connected to the communication path 20 via an on-off valve 21.

Figure 2:
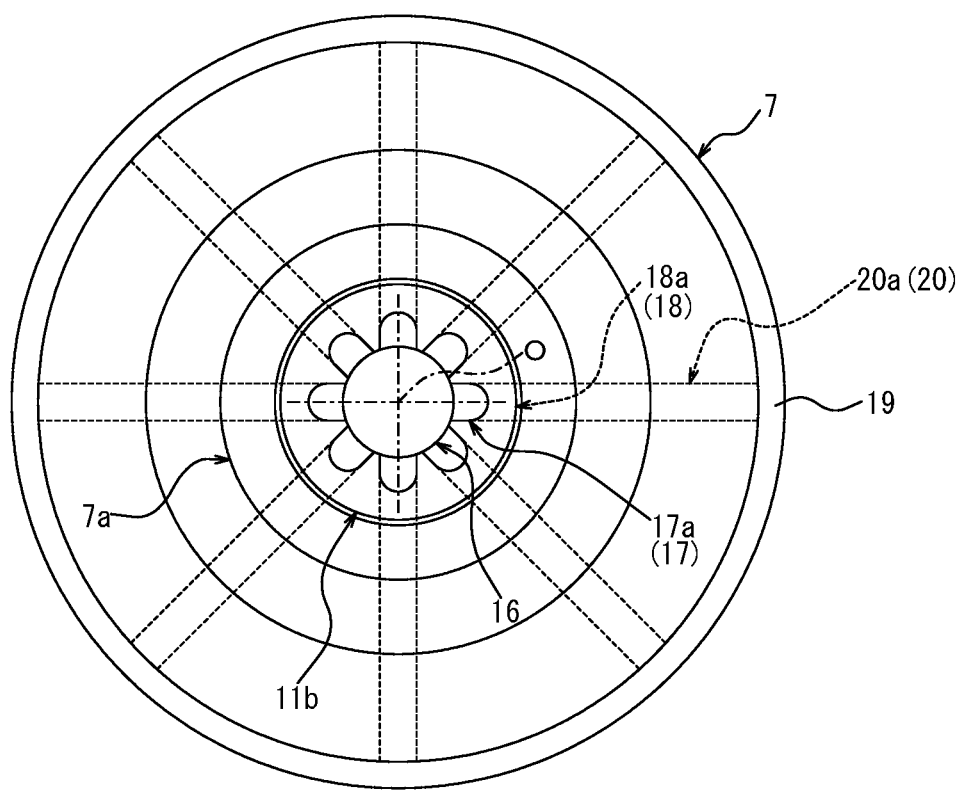
FIG. 2 is a bottom view of a stretching rod, a seal body, and a nozzle illustrated in FIG. 1.

The communication path 20 is composed of eight radial passages 20a arranged at regular intervals in the circumferential direction, as illustrated in FIGS. 1 and 2. Each radial passage 20a has a cylindrical inner circumferential surface shape extending in the radial direction from one end open on the inner circumferential surface of the sandwiched portion 7b to the other end open on the outer circumferential surface of the sandwiched portion 7b. Each radial passage 20a may have a sectional shape other than circular, and may extend in a direction inclined in at least one of the axial direction and the circumferential direction with respect to the radial direction. A ring-shaped depression 19 concentric with the central axis O is provided in the outer circumferential surface of the sandwiched portion 7b, and the other end of each radial passage 20a is open to the ring-shaped depression 19. The ring-shaped depression 19 forms a ring-shaped passage 23 together with the inner circumferential surface of the main block 6. Thus, the other end of each radial passage 20a is connected to the fluid suction source 22 through the ring-shaped passage 23 and the on-off valve 21.

The concave communication depression 17 extending from the lower end of the tubular wall 11b to the communication port 18 open on the outer circumferential surface of the tubular wall 11b is provided in the inner circumferential surface of the seal body 11. The communication depression 17 is composed of eight vertical grooves 17a arranged at regular intervals in the circumferential direction of the tubular wall 11b and each extending in the vertical direction. Each vertical groove 17a has a U cross-sectional shape that is open radially inward throughout its length (the vertical direction). The cross-sectional shape of each vertical groove 17a is, however, not limited to such U-shape. Moreover, each vertical groove 17a is not limited to extending in the vertical direction. For example, each vertical groove 17a may extend spirally about the central axis O. The inner circumferential surface of the tubular wall 11b located between the eight vertical grooves 17a is configured to be in contact with the outer circumferential surface of the stretching rod 16. The tubular wall 11b can thus serve to guide the stretching rod 16. Alternatively, the inner circumferential surface of the tubular wall 11b located between the eight vertical grooves 17a may be configured to be not in contact with the outer circumferential surface of the stretching rod 16. Each vertical groove 17a extends to the lower end of the tubular wall 11b at its lower end. Each vertical groove 17a extends to the communication port 18 at its upper end. The communication port 18 is composed of an opening 18a of a cylindrical inner circumferential surface shape connected to the upper end of each of the eight vertical grooves 17a. That is, the communication port 18 is composed of eight openings 18a.

The eight sets of vertical grooves 17a, openings 18a, and radial passages 20a may be arranged not at regular intervals in the circumferential direction. The cross-sectional areas of the vertical grooves 17a may be different from each other. The number of sets of vertical grooves 17a, openings 18a, and radial passages 20a is not limited to eight, and may be changed as appropriate. The communication port 18 may extend in the circumferential direction with respect to the central axis O and communicate with the plurality of vertical grooves 17a. In this case, the number of vertical grooves 17a and the number of radial passages 20a may be different from each other. The number of radial passages 20a may be one, with the on-off valve 21 being connected to the other end of the radial passage 20a (i.e. the ring-shaped passage 23 is not provided). In FIGS. 1 and 2, etc., only one vertical groove 17a, one opening 18a, and one radial passage 20a are given reference signs, for the sake of convenience.

The communication depression 17 is not limited to being composed of the vertical grooves 17a. For example, the communication depression 17 may be composed of the vertical grooves 17a and one or more annular grooves extending all around the central axis O. The communication depression 17 may be composed of an annular depression extending from the lower end of the tubular wall 11b to the communication port 18 and also extending all around the central axis O.

The on-off valve 21 is preferably provided inside the nozzle unit 5, but may be provided outside the nozzle unit 5. The on-off valve 21 is a motor-operated control valve, and can be opened and closed by a control means (not illustrated). Alternatively, the on-off valve 21 may be, for example, a pneumatic or hydraulic control valve.

The fluid suction source 22 is formed by, for example, a vacuum pump, and can suck the incompressible fluid from the ring-shaped passage 23 and the communication path 20 when the on-off valve 21 is open. Thus, when the seal body 11 is in the closed position and the lower end of the stretching rod 16 is approximately flush with the respective lower ends of the nozzle tip 7a and the tubular wall 11b, the fluid suction source 22 can suck the incompressible fluid adhering to the lower ends of these parts through the communication depression 17, the communication port 18, the communication path 20, and the ring-shaped passage 23 to prevent the incompressible fluid from dripping down.

An example of a procedure whereby the blow molding device 1 blow molds the preform 2 will be described below.

First, as illustrated in FIG. 1, the preform 2 is placed in the mold 3 in a state in which the seal body 11 is in the closed position to close the nozzle 7. Following this, the nozzle unit 5 is lowered and the nozzle tip 7a is inserted into the mouth portion 2a of the preform 2. At this time, the stretching rod 16 is at an origin position at which its lower end is flush with the lower end of the tubular wall 11b of the seal body 11.

The seal body 11 is then moved to the open position to open the nozzle 7. After the nozzle 7 is opened, the pressurized incompressible fluid is supplied from the pressurized fluid supply source 10 into the preform 2 through the supply path 8 and the nozzle 7, and the preform 2 undergoes blow molding (liquid blow molding) by the incompressible fluid. In the blow molding, the stretching rod 16 is lowered to stretch the preform 2 in the axial direction (longitudinal direction). By such biaxial stretching blow molding, the preform 2 is molded into the container C of a bottle shape along the cavity 4 of the mold 3, as illustrated in FIG. 3.

Figure 4:
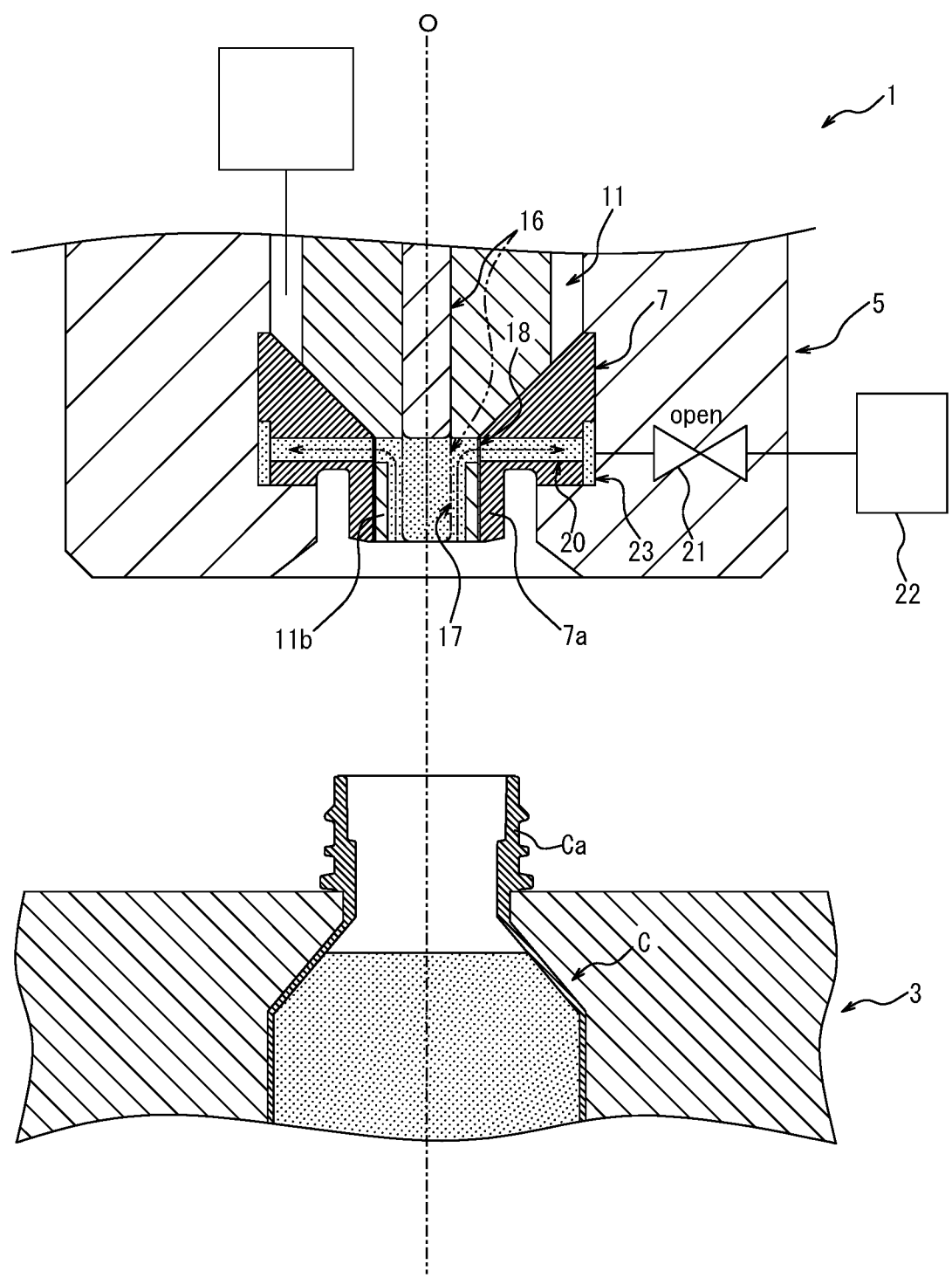
FIG. 4 is a longitudinal sectional view illustrating the blow molding device illustrated in FIG. 1 in a state in which the nozzle is separated from a blow-molded container.

After the blow molding is completed, the seal body 11 is lowered to the closed position to close the nozzle 7, thus stopping the supply of the incompressible fluid. Moreover, the stretching rod 16 is raised to the origin position, i.e. the position at which its lower end is flush with the lower end of the tubular wall 11b of the seal body 11 as indicated by a dashed-two dotted line in FIG. 4. The nozzle unit 5 is then raised to separate the nozzle tip 7a upward from the mouth portion Ca of the container C, as illustrated in FIG. 4. The timing at which the stretching rod 16 is raised to the origin position may be before or after the nozzle tip 7a separates from the mouth portion Ca of the container C. As a result of the stretching rod 16 being raised and removed from the incompressible fluid inside the container C, a headspace corresponding to the volume of the removed stretching rod is formed inside the container C. The headspace may be formed by any other method. The rod 16 may be used not as a rod for biaxial stretching but as a rod for headspace formation.

After the completion of the blow molding, the on-off valve 21 is opened and the fluid suction source 22 starts operation, as a result of which the incompressible fluid adhering to the nozzle tip 7a, the tubular wall 11b, and the lower end of the stretching rod 16 is sucked through the communication depression 17, the communication port 18, the communication path 20, and the ring-shaped passage 23 as indicated by dashed arrows in FIG. 4. When raising the stretching rod 16 after the blow molding, the incompressible fluid adhering to the outer circumferential surface of the stretching rod 16 can be directly sucked from the communication depression 17 provided in the inner circumferential surface of the seal body 11, so that the incompressible fluid adhering to the outer circumferential surface of the stretching rod 16 can be sucked effectively. During this, the stretching rod 16 is squeezed by the seal body 11, so that the incompressible fluid adhering to the outer circumferential surface of the stretching rod 16 can be accumulated near the upper end of the communication depression 17. This also contributes to effective suction of the incompressible fluid adhering to the outer circumferential surface of the stretching rod 16.

Thus, in the blow molding device 1, the communication depression 17 extending from the lower end of the tubular wall 11b to the communication port 18 is provided in the inner circumferential surface of the seal body 11. Therefore, not only the incompressible fluid adhering to the nozzle tip 7a, the tubular wall 11b, and the lower end of the stretching rod 16 but also the incompressible fluid adhering to the outer circumferential surface of the stretching rod 16 can be effectively sucked by the communication depression 17 to prevent the incompressible fluid from dripping from the nozzle 7, thus preventing the incompressible fluid from adhering to the molded container C or the mold 3. Particularly in the case where the incompressible fluid is a liquid with relatively high viscosity such as a shampoo or a liquid detergent, the blow molding device 1 can prevent the liquid from dripping down and efficiently perform blow molding without increasing the cycle time.

After the completion of the blow molding, the stretching rod 16 may be raised to a position at which its lower end is flush with the upper end of the communication depression 17 as indicated by a solid line in FIG. 4, and, in this state, the incompressible fluid adhering to the lower end of the stretching rod 16 may be sucked through the communication depression 17, the communication port 18, and the communication path 20. The timing at which the stretching rod 16 is raised to this position may be before or after the nozzle tip 7a separates from the mouth portion Ca of the container C. In this way, the incompressible fluid adhering to the lower end of the stretching rod 16 can be sucked efficiently. After sucking the incompressible fluid adhering to the lower end of the stretching rod 16 in this way, the stretching rod 16 may be lowered to the origin position, and, in this state, the incompressible fluid adhering to the nozzle tip 7a, the tubular wall 11b, and the lower end of the stretching rod 16 may be sucked through the communication depression 17, the communication port 18, and the communication path 20. In this way, the incompressible fluid can be sucked more efficiently.

A modification of the blow molding device 1 will be described below.

Figure 5A:
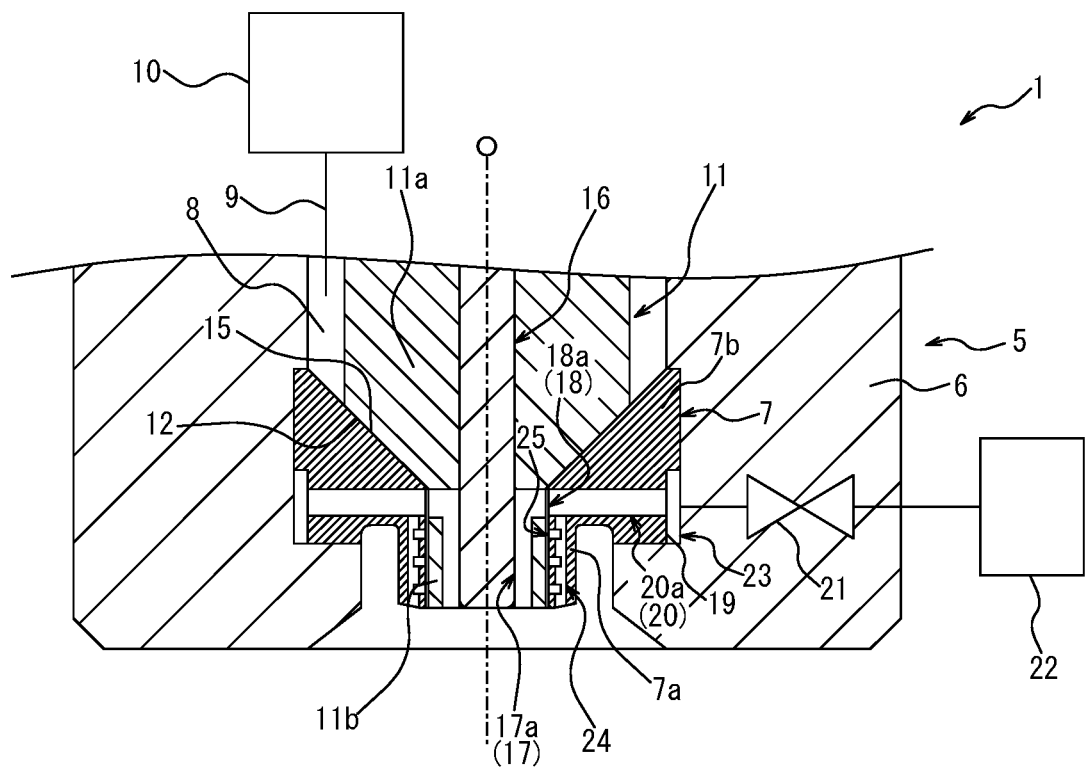
FIG. 5A is a longitudinal sectional view illustrating a modification of the blow molding device illustrated in FIG. 1.
Figure 5B:
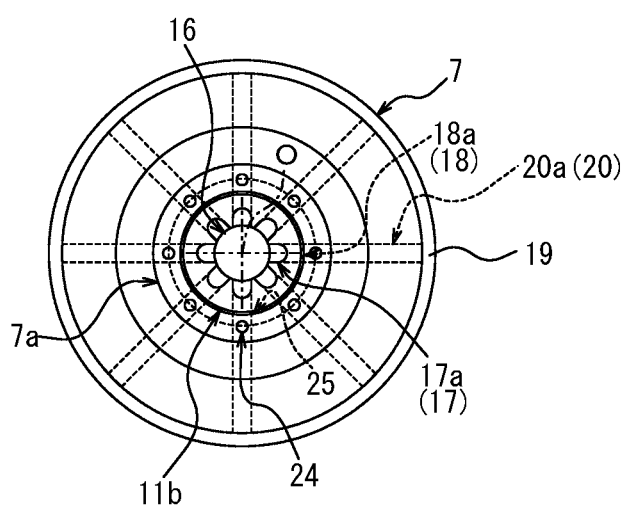
FIG. 5B is a bottom view of a stretching rod, a seal body, and a nozzle illustrated in FIG. 5A.

As illustrated in FIGS. 5A and 5B, in a blow molding device 1 according to this modification, a nozzle 7 has eight vertical holes 24 open to the lower end of the nozzle tip 7a, and three annular grooves 25 provided in the inner circumferential surface of the nozzle 7 and shaped like a ring around the central axis O. In FIGS. 5A and 5B, only one vertical hole 24 and one annular groove 25 are given reference signs, for the sake of convenience. The mold 3 and the preform 2 are not illustrated in FIG. 5A. In FIGS. 5A and 5B, the parts corresponding to those in the foregoing embodiment are given the same reference signs.

Each vertical hole 24 extends in the vertical direction, and is open to the radial passage 20a at its upper end. The three annular grooves 25 are arranged in the axial direction. Each annular groove 25 intersects with the eight vertical holes 24, and forms an opening at each intersection. The number of vertical holes 24 may be changed as appropriate according to the number of radial passages. The number of annular grooves 25 may be changed as appropriate. The annular grooves 25 may be omitted. The other components are the same as those in the foregoing embodiment.

With this structure, the incompressible fluid can be sucked not only from the communication depression 17 but also from the vertical holes 24 and the annular grooves 25 provided in the nozzle 7, so that the incompressible fluid adhering to the nozzle tip 7a, the tubular wall 11b, and the lower end of the stretching rod 16 can be sucked particularly effectively.

Another modification of the blow molding device 1 will be described below.

Figure 6A:
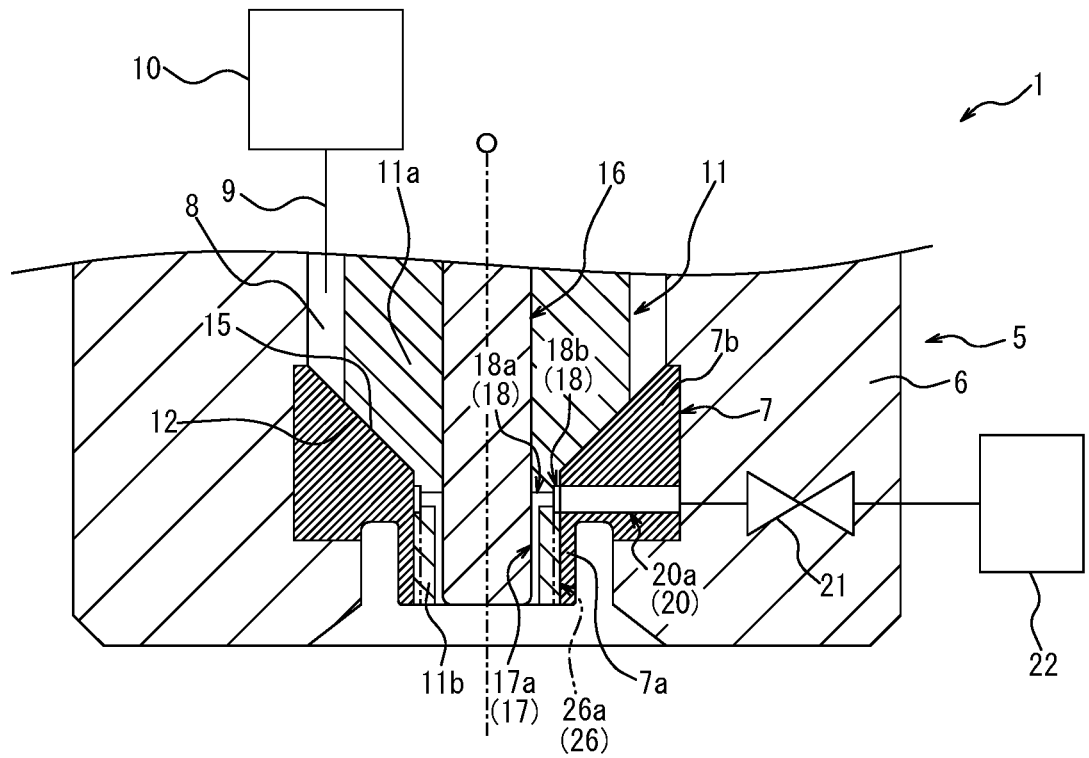
FIG. 6A is a longitudinal sectional view illustrating another modification of the blow molding device illustrated in FIG. 1.
Figure 6B:
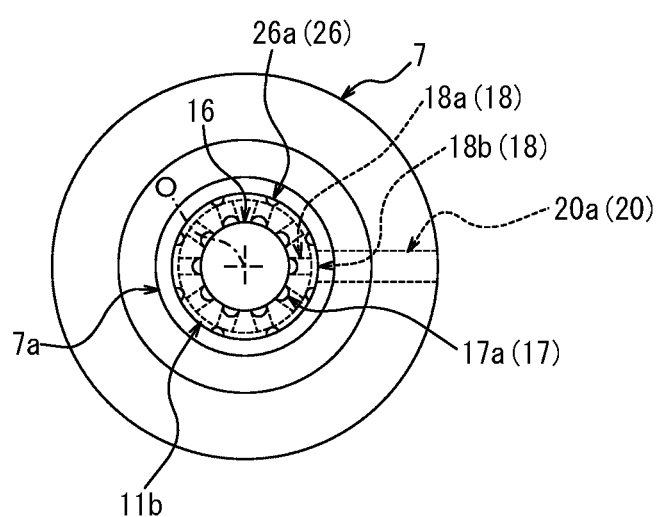
FIG. 6B is a bottom view of a stretching rod, a seal body, and a nozzle illustrated in FIG. 6A.

As illustrated in FIGS. 6A and 6B, a blow molding device 1 according to this modification has a communication depression 17 composed of ten vertical grooves 17a arranged at regular intervals in the circumferential direction of the tubular wall 11b and each extending in the vertical direction.

In this modification, a concave outer communication depression 26 extending from the lower end of the tubular wall 11b to the communication port 18 is provided in the outer circumferential surface of the seal body 11. The outer communication depression 26 is composed of eight outer vertical grooves arranged at regular intervals in the circumferential direction of the tubular wall 11b and each extending in the vertical direction. Each outer vertical groove 26a has a U cross-sectional shape that is open radially outward throughout its length (the vertical direction). The cross-sectional shape of each outer vertical groove 26a is, however, not limited to such U-shape. Moreover, each outer vertical groove 26a is not limited to extending in the vertical direction. For example, each outer vertical groove 26a may extend spirally about the central axis O. The outer circumferential surface of the tubular wall 11b located between the eight outer vertical grooves 26a may be spaced from or in contact with the inner circumferential surface of the nozzle tip 7a. Each outer vertical groove 26a extends to the lower end of the tubular wall 11b at its lower end. Each outer vertical groove 26a extends to the communication port 18 at its upper end.

The communication port 18 is composed of an annular groove 18b provided in the outer circumferential surface of the seal body 11, connected to the upper end of each outer vertical groove 26a, and centered at the central axis O, and an opening 18a of a cylindrical inner circumferential surface shape connecting the upper end of each of the ten vertical grooves 17a to the annular groove 18b. In this modification, the communication path 20 is composed of one radial passage 20a. The radial passage 20a has one end connected to the annular groove 18b, and the other end connected to the on-off valve 21.

In FIGS. 6A and 6B, only one vertical groove 17a, one opening 18a, and one outer vertical groove 26a are given reference signs, for the sake of convenience. The mold 3 and the preform 2 are not illustrated in FIG. 6A.

In FIGS. 6A and 6B, the parts corresponding to those in the foregoing embodiment are given the same reference signs.

The ten sets of vertical grooves 17a and openings 18a may be arranged not at regular intervals in the circumferential direction. The eight outer vertical grooves 26a may be arranged not at regular intervals in the circumferential direction. The cross-sectional areas of the outer vertical grooves 26a may be different from each other. The number of sets of vertical grooves 17a and openings 18a is not limited to ten, and may be changed as appropriate. The number of outer vertical grooves 26a is not limited to eight, and may be changed as appropriate. The communication port 18 is not limited to be composed of the annular groove 18b and the openings 18a. In this modification, the shape of each vertical groove 17a may be changed as mentioned above. The communication depression 17 is not limited to be composed of the vertical grooves 17a, and may be changed as mentioned above.

With this structure, the incompressible fluid can be sucked not only from the communication depression 17 but also from the outer communication depression 26 provided in the outer circumferential surface of the seal body 11, so that the incompressible fluid adhering to the nozzle tip 7a, the tubular wall 11b, and the lower end of the stretching rod 16 can be sucked particularly effectively.

The present disclosure is not limited to the foregoing embodiment, and various changes can be made without departing from the scope of the present disclosure.

For example, in the foregoing embodiment and its modifications, the blow molding device 1 includes the fluid suction source 22 capable of sucking the incompressible fluid from the communication depression 17 through the on-off valve 21, the communication path 20, and the communication port 18. The blow molding device 1 may include, instead of or in addition to the fluid suction source 22, a pressurized gas supply source capable of supplying a pressurized gas that blows off the incompressible fluid from the communication depression 17 (or the communication depression 17 and the outer communication depression 26) through the on-off valve 21, the communication path 20, and the communication port 18. For example, the pressurized gas supply source may be formed by a plunger pump. With this structure, not only the incompressible fluid adhering to the nozzle tip 7a, the tubular wall 11b, and the lower end of the rod 16 but also the incompressible fluid adhering to the outer circumferential surface of the rod 16 can be blown off from the communication depression 17 and dropped into the container C. Hence, the incompressible fluid can be prevented from dripping from the nozzle 7, and thus prevented from adhering to the molded container C or the mold 3.

In the foregoing embodiment and its modifications, the nozzle tip 7a and the tubular wall 11b are cylindrical. However, the nozzle tip 7a and the tubular wall 11b may be tubular with a sectional shape such as polygonal or elliptic. In the case where the mouth portion 2a of the preform 2 is cylindrical, it is preferable that the outer circumferential surface of the nozzle tip 7a is cylindrical. The lower end of the tubular wall 11b may have an annular inclined surface inclined upward to the radial inner side, from its outer circumferential edge to its inner circumferential edge. For example, the lower end of the tubular wall 11b may be composed of an annular horizontal surface and an annular inclined surface located on the radial inner side of the annular horizontal surface. In such a case, the position at which the lower end of the rod 16 coincides with the upper end of the annular inclined surface can be set as the origin position of the rod 16.

In the foregoing embodiment and its modifications, the rod 16 is shaped like a solid column. However, for example, the rod 16 may internally have a flow path connected to the pressurized fluid supply source 10. In this case, the rod 16 may be, for example, composed of a cylindrical outer tube and a poppet valve-shaped opening/closing rod capable of opening and closing the lower end of the outer tube. A prefilling step of prefilling the preform 2 with the incompressible fluid through the flow path inside the rod 16 before the blow molding may be performed. Moreover, a suck back step of sucking the incompressible fluid from inside the blow-molded container C back to the pressurized fluid supply source 10 through the flow path inside the rod 16 may be performed. To enable discharge of air inside the preform 2 to the outside through the communication depression 17, the communication port 18, the communication path 20, and the ring-shaped passage 23 in the prefilling step, an air discharge path that can be opened and closed may be provided in the ring-shaped passage 23. In such a case where the flow path is provided in the rod 16, too, the rod 16 may or may not be used as a rod for biaxial stretching.

In the foregoing embodiment and its modifications, the tubular wall 11b is configured so that its lower end is flush with the lower end of the nozzle tip 7a when the seal body 11 is in the closed position. Alternatively, the tubular wall 11b may be configured so that its lower end is located higher or lower than the lower end of the nozzle tip 7a when the seal body 11 is in the closed position, depending on the type of the incompressible fluid and the like.

REFERENCE SIGNS LIST 1 blow molding device
2 preform
2a mouth portion
3 mold
4 cavity
5 nozzle unit
6 main block
7 nozzle
7a nozzle tip
7b sandwiched portion
8 supply path
9 piping
10 pressurized fluid supply source
11 seal body
11a large-diameter portion
11b tubular wall
12 inclined surface
15 closed surface
16 rod
17 communication depression
17a vertical groove
18 communication port
18a opening
18b annular groove
19 ring-shaped depression
20 communication path
20a radial passage
21 on-off valve
22 fluid suction source
23 ring-shaped passage
24 vertical hole
25 annular groove
26 outer communication depression
26a outer vertical groove
O central axis
C container
Ca mouth portion

The invention claimed is:

1. A blow molding device comprising:
a tubular nozzle;
a pressurized fluid supply source configured to supply a pressurized incompressible fluid to the nozzle;
a tubular seal body configured to move in a vertical direction between a closed position in which the nozzle is closed and an open position in which the nozzle is open; and
a rod having an outer circumferential surface that faces an inner circumferential surface of the seal body, and configured to move in the vertical direction,
wherein the seal body includes a tubular wall having an outer circumferential surface that faces the nozzle when the seal body is in the closed position,
a concave communication depression extending from a lower end of the tubular wall to a communication port open on the outer circumferential surface of the tubular wall is provided in the inner circumferential surface of the seal body,
a communication path that communicates with the communication port when the seal body is in the closed position is provided in the nozzle, and
the blow molding device further comprises at least one of: a fluid suction source configured to suck the incompressible fluid from the communication depression through the communication path and the communication port; and a pressurized gas supply source configured to supply a pressurized gas that blows off the incompressible fluid from the communication depression through the communication path and the communication port.

2. The blow molding device according to claim 1, wherein the communication depression is composed of a plurality of vertical grooves arranged at regular intervals in a circumferential direction of the tubular wall and each extending in the vertical direction, and
an inner circumferential surface of the tubular wall located between the plurality of vertical grooves comes into contact with the outer circumferential surface of the rod.

3. The blow molding device according to claim 1, wherein a concave outer communication depression extending from the lower end of the tubular wall to the communication port is provided in an outer circumferential surface of the seal body.

4. The blow molding device according to claim 3, wherein the outer communication depression is composed of a plurality of outer vertical grooves arranged at regular intervals in a circumferential direction of the tubular wall and each extending in the vertical direction.

5. The blow molding device according to claim 2, wherein a concave outer communication depression extending from the lower end of the tubular wall to the communication port is provided in an outer circumferential surface of the seal body.

6. The blow molding device according to claim 5, wherein the outer communication depression is composed of a plurality of outer vertical grooves arranged at regular intervals in a circumferential direction of the tubular wall and each extending in the vertical direction.

* * * * *